(12) United States Patent
Lee et al.

(10) Patent No.: US 8,009,662 B2
(45) Date of Patent: Aug. 30, 2011

(54) DIGITAL BROADCASTING SYSTEM AND METHOD OF PROCESSING DATA

(75) Inventors: Hyoung Gon Lee, Seoul (KR); In Hwan Choi, Seoul (KR); Kook Yeon Kwak, Seoul (KR); Jong Moon Kim, Seoul (KR); Won Gyu Song, Seoul (KR); Byoung Gill Kim, Seoul (KR); Jin Woo Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 877 days.

(21) Appl. No.: 11/961,771

(22) Filed: Dec. 20, 2007

(65) Prior Publication Data

US 2008/0152035 A1 Jun. 26, 2008

Related U.S. Application Data

(60) Provisional application No. 60/871,412, filed on Dec. 21, 2006.

(30) Foreign Application Priority Data

Dec. 20, 2006 (KR) .......................... 10-2006-0131229

(51) Int. Cl.
| | |
|---|---|
| H04J 3/06 | (2006.01) |
| G06F 15/16 | (2006.01) |
| H04N 5/93 | (2006.01) |
| H04N 5/917 | (2006.01) |
| G06F 7/00 | (2006.01) |
| G06F 17/00 | (2006.01) |
| G11B 27/00 | (2006.01) |
| H04N 7/167 | (2011.01) |

(52) U.S. Cl. .............. 370/350; 375/240.01; 375/240.27; 386/213; 386/248; 386/330

(58) Field of Classification Search ................... 370/350
See application file for complete search history.

(56) References Cited

U.S. PATENT DOCUMENTS

| | | | |
|---|---|---|---|
| 7,058,027 B1 * | 6/2006 | Alessi et al. ................ 370/310.1 |
| 7,092,455 B2 | 8/2006 | Choi et al. | |
| 7,168,030 B2 * | 1/2007 | Ariyoshi ....................... 714/786 |
| 7,188,300 B2 * | 3/2007 | Eriksson et al. .............. 714/790 |
| 7,277,625 B2 * | 10/2007 | Kawamura et al. ........... 386/241 |
| 7,295,764 B2 * | 11/2007 | Betti et al. .................... 386/265 |
| 7,310,768 B2 * | 12/2007 | Eidson et al. ................ 714/786 |
| 7,366,195 B2 * | 4/2008 | Hwang ......................... 370/432 |
| 7,366,462 B2 * | 4/2008 | Murali et al. ................ 455/3.06 |
| 7,408,991 B2 * | 8/2008 | Hourunranta ............ 375/240.24 |
| 7,474,677 B2 * | 1/2009 | Trott ............................. 370/473 |
| 7,490,169 B1 * | 2/2009 | Ogdon et al. ................. 709/248 |
| 7,508,839 B2 * | 3/2009 | Vesma et al. .................. 370/466 |

(Continued)

FOREIGN PATENT DOCUMENTS

WO 2004043073 A1 5/2004
(Continued)

*Primary Examiner* — Andrew Caldwell
*Assistant Examiner* — Melvin H Pollack
(74) *Attorney, Agent, or Firm* — Lee, Hong, Degerman, Kang & Waimey

(57) ABSTRACT

A digital broadcasting system and method of processing data are disclosed. The digital broadcasting system includes a transmitting system and a receiving system. The transmitting system comprises a distributed transmission adapter and a plurality of transmitters each being operated as a slave of the distributed transmission adapter, and each sharing the same frequency and transmitting the same signals.

8 Claims, 10 Drawing Sheets

U.S. PATENT DOCUMENTS

| | | | |
|---|---|---|---|
| 7,529,272 B1* | 5/2009 | Beser | 370/485 |
| 7,535,863 B2* | 5/2009 | Gin et al. | 370/316 |
| 7,577,207 B2* | 8/2009 | Eroz et al. | 375/261 |
| 7,599,348 B2* | 10/2009 | Kang et al. | 370/350 |
| RE40,958 E* | 11/2009 | Oshima | 369/53.11 |
| 7,636,724 B2* | 12/2009 | de la Torre et al. | 1/1 |
| 7,656,950 B2* | 2/2010 | Garrido et al. | 375/240.11 |
| 7,669,105 B2* | 2/2010 | Pisek et al. | 714/755 |
| 7,693,508 B2* | 4/2010 | Leung et al. | 455/412.1 |
| 7,706,481 B2* | 4/2010 | Heiman et al. | 375/341 |
| 7,716,565 B2* | 5/2010 | Heiman et al. | 714/795 |
| 7,738,596 B2* | 6/2010 | Lin et al. | 375/316 |
| 7,747,930 B2* | 6/2010 | Pekonen et al. | 714/784 |
| 7,864,805 B2* | 1/2011 | Hannuksela | 370/473 |
| 2007/0005795 A1* | 1/2007 | Gonzalez | 709/232 |
| 2007/0019578 A1* | 1/2007 | Meiri | 370/311 |
| 2007/0044126 A1* | 2/2007 | Mitchell | 725/81 |
| 2007/0066268 A1* | 3/2007 | Simic et al. | 455/318 |
| 2007/0076764 A1* | 4/2007 | Kawada et al. | 370/503 |
| 2007/0088971 A1* | 4/2007 | Walker et al. | 714/4 |
| 2007/0136780 A1* | 6/2007 | Park | 725/136 |
| 2007/0147384 A1* | 6/2007 | Pekonen et al. | 370/394 |
| 2007/0165757 A1* | 7/2007 | Heiman et al. | 375/347 |
| 2007/0189713 A1* | 8/2007 | Choi et al. | 386/83 |
| 2007/0277077 A1* | 11/2007 | Vesma et al. | 714/755 |
| 2008/0052604 A1* | 2/2008 | Karaoguz et al. | 714/776 |
| 2008/0123781 A1* | 5/2008 | Pisek et al. | 375/340 |
| 2009/0055715 A1* | 2/2009 | Jashek et al. | 714/776 |
| 2009/0063695 A1* | 3/2009 | Song et al. | 709/231 |

FOREIGN PATENT DOCUMENTS

| | | |
|---|---|---|
| WO | 2006004303 A1 | 1/2006 |

* cited by examiner

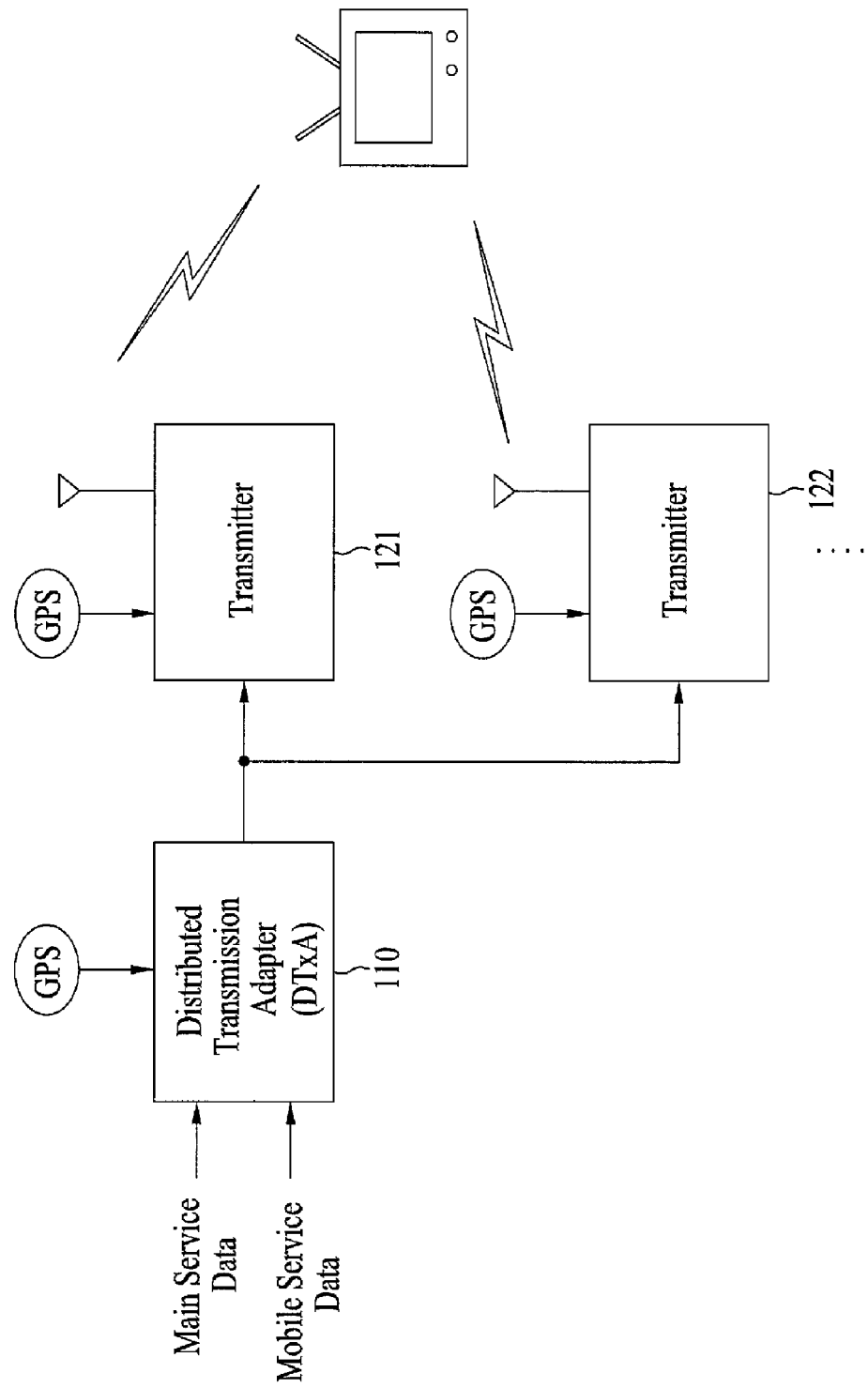

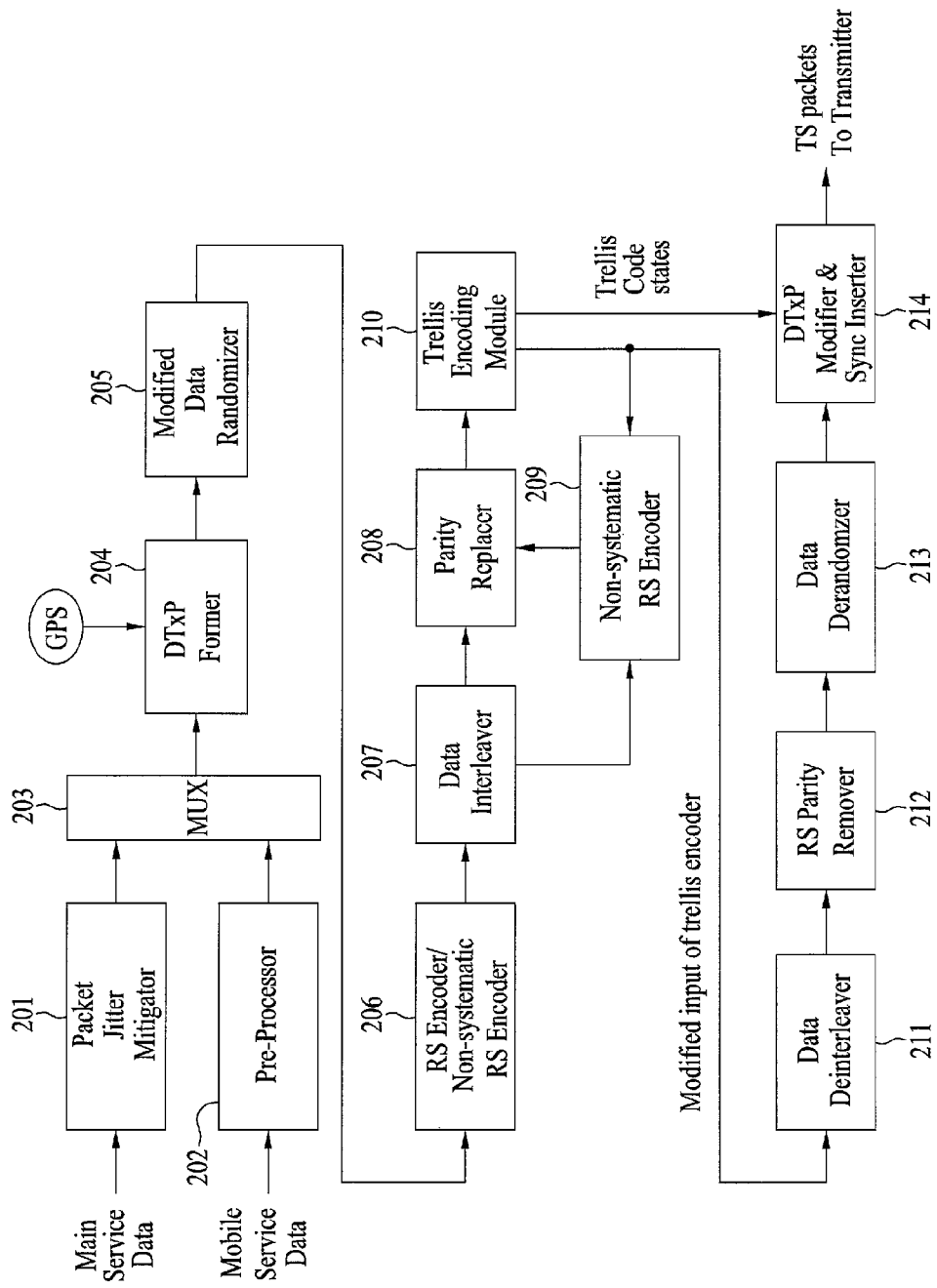

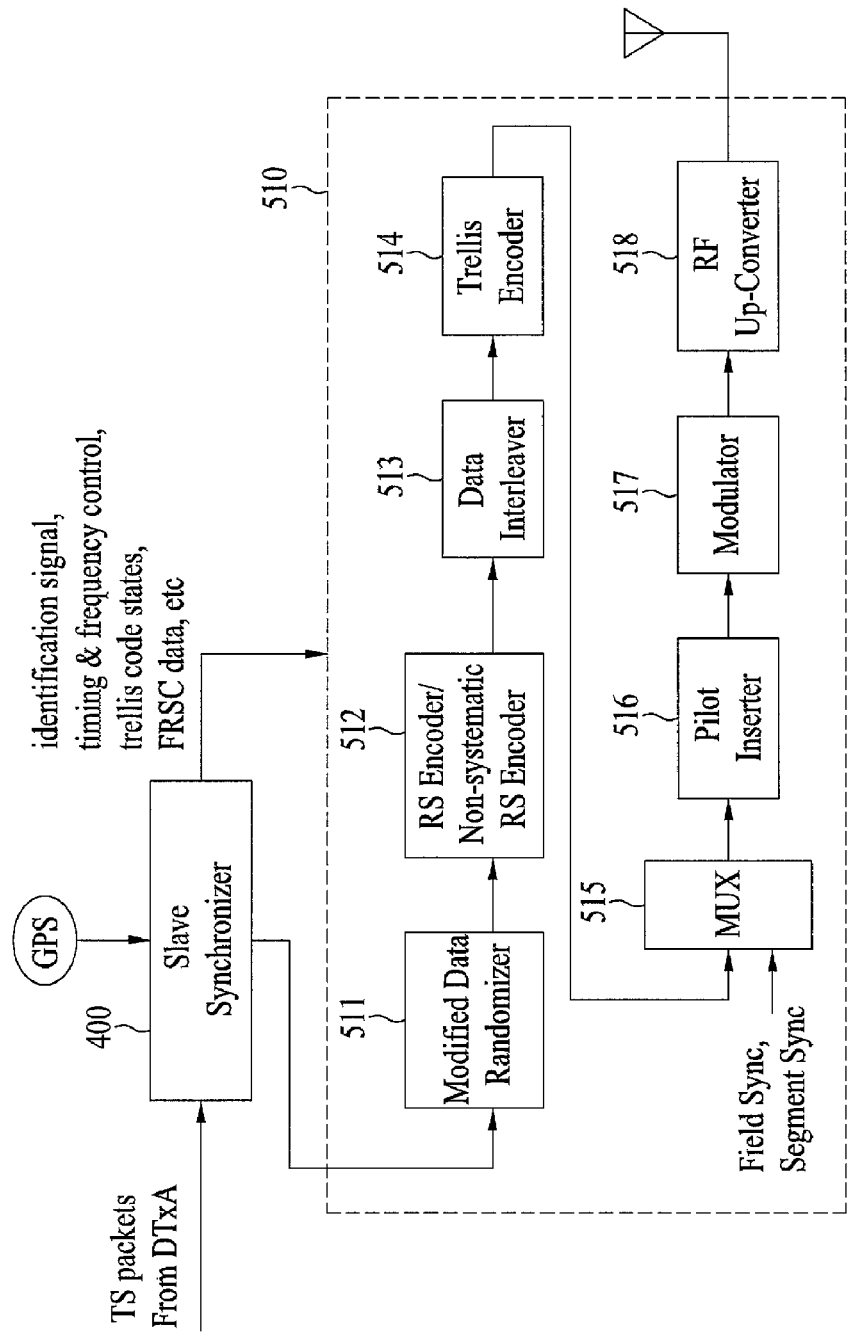

FIG. 6A

| Syntax | No. of BITS | Format |
|---|---|---|
| OM_packet () { | | |
| OM_type | 8 | bslbf |
| OM_payload | 8*N | bslbf |
| } | | |

FIG. 6B

| Syntax | No. of Bits | Format |
|---|---|---|
| DTx_packet () { | | |
|     reserved | 8 | 0xFF |
|     for (i=0; i<12; i++) { | | |
|         trellis_code_state | 8 | riuimsbfwp |
|     } | | |
|     synchronization_time_stamp | 24 | uimsbf |
|     maximum_delay | 24 | uimsbf |
|     network_identifier_pattern | 12 | uimsbf |
|     stream_locked_flag | 1 | bslbf |
|     reserved | 1 | '1' |
|     packet_number | 10 | uimsbf |
|     reserved | 32 | 0xFFFFFFFF |
|     tx_group_number | 8 | uimsbf |
|     for (i=0; i<16; i++) { | | |
|         tx_address | 12 | uimsbf |
|         tx_identifier_level | 3 | uimsbf |
|         tx_data_inhibit | 1 | bslbf |
|         tx_time_offset | 16 | tcimsbf |
|         tx_power | 12 | uipfmsbf |
|         reserved | 4 | '1111' |
|     } | | |
|     reserved | 320 | for (i=0; i<40; i++) 0xFF |
|     DTxP_ECC | 160 | uimsbf |
| } | | |

FIG. 6C

| Syntax | No. of Bits | Format |
|---|---|---|
| Field Rate Side Channel () { | | |
| VSB_mode_data | 24 | bslbf |
| dfs_reserved_data | 92 | bslbf |
| reserved | 36 | bslbf |
| side_channel_ECC | 160 | uimsbf |
| } | | |

DIGITAL BROADCASTING SYSTEM AND METHOD OF PROCESSING DATA

This application claims the benefit of the Korean Patent Application No. 10-2006-0131229, filed on Dec. 20, 2006, which is hereby incorporated by reference as if fully set forth herein. This application also claims the benefit of U.S. Provisional Application No. 60/871,412, filed on Dec. 21, 2006, which is hereby incorporated by reference.

BACKGROUND OF THE INVENTION

1. Field of the Invention

The present invention relates to a digital broadcasting system and a method of processing data.

2. Discussion of the Related Art

The Vestigial Sideband (VSB) transmission method, which is adopted as the standard for digital broadcasting in North America and the Republic of Korea, is a system using a single carrier method. Therefore, the receiving performance of the receiving system may be deteriorated in a poor channel environment. Particularly, since resistance to changes in channels and noise is more highly required when using portable and/or mobile broadcast receivers, the receiving performance may be even more deteriorated when transmitting mobile service data by the VSB transmission method.

SUMMARY OF THE INVENTION

Accordingly, the present invention is directed to a digital broadcasting system and a data processing method that substantially obviate one or more problems due to limitations and disadvantages of the related art.

An object of the present invention is to provide a digital broadcasting system and a method of processing data that are highly resistant to channel changes and noise.

Another object of the present invention is to provide a digital broadcasting system and a method of processing data that can enhance the receiving performance of a receiving system by performing additional encoding on mobile service data and by transmitting the processed data to the receiving system.

A further object of the present invention is to provide a digital broadcasting system and a method of processing data that can transmit mobile service data through a single frequency network (SFN).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of processing data in a distributed transmission adapter of a transmitting system included in a digital broadcasting system may include performing primary encoding on mobile service data and multiplexing the primarily encoded mobile service data and main service data in packet units, inserting initialization information for trellis encoding module and time and frequency information for a single frequency network in a predetermined data packet among the multiplexed data packets, performing secondary encoding on the processed data packets and generating initialization data for initializing a memory of a trellis encoding module at a starting point of a known data sequence, thereby modifying input data of the trellis encoding module, and transmitting the modified data so as to modify the initialization data for initializing the memory of the trellis encoding module by using status information of the trellis encoding module, and a identification signal for designating an insertion point of a field synchronization signal, thereby outputting the generated identification signal to each transmitter.

Herein, the step of multiplexing the primarily encoded mobile service data and main service data in packet units further includes forming a data group having a plurality of mobile service data packets included therein, adjusting a relative position of at least one main service data packet of a main service data section, the main service data section including a plurality of main service data packets, and multiplexing mobile service data of the data group and main service data of the main service data section to form a burst structure.

In another aspect of the present invention, a method of processing data in a transmitter of a transmitting system included in a digital broadcasting system may include recovering trellis code status information, time and frequency information for a single frequency network, and identification information from a predetermined data packet among a plurality of data packets being transmitted from a distributed transmission adapter, the identification information designating insertion of field synchronization signals, and performing error correction encoding and trellis-encoding processes and inserting field synchronization and segment synchronization signals by using the recovered information, and modulating the processed data so as to transmit the modulated data through an antenna.

In another aspect of the present invention, a distributed transmission adapter of a transmitting system includes a pre-processor, a multiplexer, an information former, an encoder, and an information modifier and synchronization inserter. The pre-processor performs primary encoding on mobile service data and forms a data group including a plurality of encoded mobile service data packets. The multiplexer multiplexes and outputs the mobile service data packets of the data group outputted from the pre-processor and main service data packets in burst units. The information former inserts initialization information for trellis encoder and time and frequency information for a single frequency network in a predetermined data packet among the multiplexed data packets. The encoder performs secondary encoding and trellis-encoding on the processed data packets outputted from the multiplexer and the information former, and generates initialization data for initializing a memory of a trellis encoding module at a starting point of a known data sequence, thereby modifying input data of the trellis encoding module. Finally, the information modifier and synchronization inserter transmits the modified data so as to modify the initialization data for initializing the memory of the trellis encoding module by using status information of the trellis encoding module, and generates a identification signal for designating an insertion point of a field synchronization signal, thereby outputting the generated identification signal to each transmitter. The distributed transmission adapter may further include a packet jitter mitigator, which adjusts a relative position of at least one main service data packet of a main service data section, wherein the main service data section includes a plurality of main service data packets, and which outputs the at least one position-adjusted main service data packet to the multiplexer.

In a further aspect of the present invention, a transmitting system includes a plurality of transmitters each being operated as a slave of a distributed transmission adapter, and each sharing the same frequency and transmitting the same signals, wherein each transmitter includes a slave synchronization unit, and a data processor. The slave synchronization unit recovers trellis code status information, time and frequency information for a single frequency network, and identification information from a predetermined data packet among a plurality of data packets being transmitted from the distributed transmission adapter, wherein the identification information designates insertion of field synchronization signal. And, the data processor performs error correction encoding and trellis-encoding processes and inserts field synchronization and segment synchronization signals by using the recovered information, and modulates the processed data so as to transmit the modulated data through an antenna.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a block diagram showing a general structure of a digital broadcasting system according to an embodiment of the present invention;

FIG. 2A illustrates a block diagram of a distributed transmission adapter shown in FIG. 1 according to an embodiment of the present invention;

FIG. 5 illustrates a block diagram of a transmitter shown in FIG. 1 according to another embodiment of the present invention;

FIG. 6A to FIG. 6C illustrate exemplary syntax structures of information required for creating a single frequency network (SFN) according to the present invention.

DETAILED DESCRIPTION OF THE INVENTION

Figure 2B:
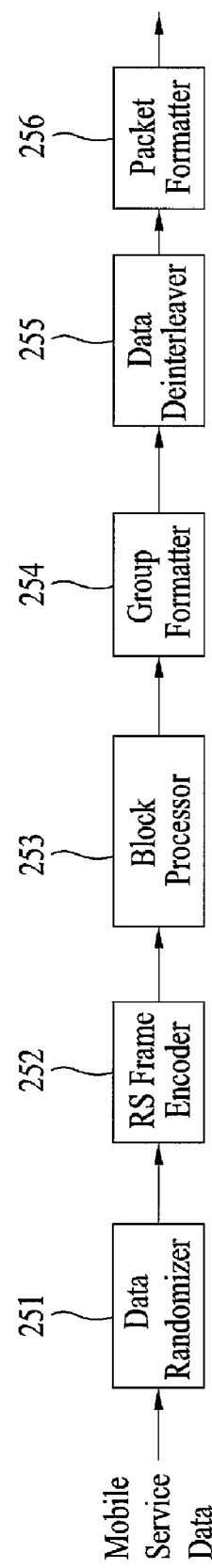
FIG. 2B illustrates a block diagram of a pre-processor shown in FIG. 2A according to an embodiment of the present invention.

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

In the present invention, the mobile service data may either consist of data including information such as program execution files, stock information, weather forecast, and so on, or consist of audio/video (A/V) data. Additionally, the known data refer to data already known based upon a pre-determined agreement between the transmitting and the receiving sides. Furthermore, the main service data consist of data that can be received from the conventional receiving system, wherein the main service data include A/V data. Also, a data service using the mobile service data may include weather forecast services, traffic information services, stock information services, viewer participation quiz programs, real-time polls & surveys, interactive education broadcast programs, gaming services, services providing information on synopsis, character, background music, and filming sites of soap operas or series, services providing information on past match scores and player profiles and achievements, and services providing information on product information and programs classified by service, medium, time, and theme enabling purchase orders to be processed. Herein, the present invention is not limited only to the services mentioned above.

The present invention relates to a transmission system that can be compatible with the conventional transmission system. Additionally, the transmission system may also multiplex the main service data and mobile service data of the same channel, and then, transmit the multiplexed data. When using the transmitting system according to the present invention, the mobile service data may be received while the user is in a mobile state (i.e., traveling). Also, the mobile service data may be received with stability despite the noise and diverse distortion occurring in the channel. Furthermore, the transmitting system according to the present invention may perform additional encoding, and insert data pre-known by both transmitting and receiving sides (i.e., known data) and transmit the processed data, thereby enhancing the receiving performance. The present invention may also mitigate packet jitter when multiplexing the main service data and the mobile service data. Furthermore, the present invention enables data to be transmitted by using a single frequency network (SFN).

FIG. 1 is a conceptual drawing of an exemplary digital broadcast system applying the present invention. Referring to FIG. 1, the transmitting system includes a distributed transmission adapter (hereinafter referred to as 'DTxA') 110, and a plurality of transmitters (or RF transmission systems) 121, 122, . . . each operating as a slave in the distributed transmission adapter (DTxA) 110. Herein, the distributed transmission adapter (DTxA) 110 and each of the plurality of transmitters 121, 122, . . . is connected to GPS (Global Position System) for external time and frequency reference.

The distributed transmission adapter (DTxA) 110 is located in studios of each broadcast station. And, each of the plurality of transmitters 121, 122, . . . is located based upon geographical features or natural features of the surrounding areas or broadcast regions. The distance and telecommunication environment between each transmitters 121, 122, . . . and the distributed transmission adapter (DTxA) 110 may differ from one another. Herein, the plurality of transmitters 121, 122, . . . shares the same frequency in order to use the single frequency network. In this case, the plurality of transmitters 121, 122, . . . transmits the same frequency to the same broadcast signals. For example, the plurality of transmitters 121, 122, . . . transmits the same frequency for the signals broadcasted through the Munhwa Broadcasting Corporation (MBC) channel.

Accordingly, in a receiving system according to the present invention, a channel equalizer recognizes the signals transmitted from each of the transmitters 121, 122, . . . as reflected signals. Thus, the receiving system may compensate the received signals, so as to recover the received signals back to their initial (or original) state. The data communication between the distributed transmission adapter (DTxA) 110 and each of the transmitters 121, 122, . . . located in remote sites may be performed by using a variety of methods. For example, a Synchronous Serial Interface for transport of MPEG-2 data (SMPTE-310M) standard may be used for the communication of data.

Also, by using the single frequency network, the present invention may enhance efficiency of frequency usage, thereby effectively broadening broadcast coverage. More specifically, since the same broadcast signals are broadcasted from a plurality of transmitters 121, 122, . . . by using the same frequency, the present invention can perform efficient usage of frequency. At this point, if the present invention uses the VSB transmission method, the broadcast system according to the present invention should synchronize the following, in order to synchronize each of the plurality of transmitters 121, 122, . . . .

First of all each of the transmitters 121, 122, . . . should be controlled so that a carrier frequency of the signals transmitted from each transmitters is identical to one another. This is because a difference in frequency among the transmitters 121, 122, . . . may be represented as a Doppler shift among the received signals, in the receiving signal, thereby burdening the channel equalizer (i.e., disturbing the functions of the channel equalizer).

Secondly, a data frame for a VSB mode data transmission is configured of 1 odd field synchronization segment (i.e., when all 3 PN63's are identical to one another) and 312 data segments connected to the odd field synchronization segment and 1 even field synchronization segment (i.e., when the first and last PN63's are identical to one another, and when the second PN63 corresponds to an inversed form), and 312 data segments connected to the even field synchronization segment. Therefore, the field synchronization segments, which are alternately inversed, should be synchronized, and transport stream (TS) packets used for configuring the data frame should be synchronized in each transmitter, respectively.

Finally, the status (or state) of a trellis encoder (including a pre-coder) of each transmitter is not initialized at a constant cycle period. Therefore, in order to enable the transmitters to output the same final symbols, the status (or state) of each trellis encoder should be set to be in the same status. More specifically, even if equal signals are inputted to the trellis encoder of each transmitter, the memory status (or state) of each trellis encoder may differ for each transmitter. In this case, each of the transmitters would eventually output different final symbols.

For this, the distributed transmission adapter (DTxA) 110 according to the present invention creates an identification signal, which is used by each transmitter for synchronizing the TS packets and the data frame. In addition, the distributed transmission adapter (DTxA) 110 also generates a distributed transmission packet (DTxP) including trellis encoder status information and timing information for frequency transmission. The distributed transmission adapter (DTxA) 110 then transmits the identification signal and distribution transmission packet (DTxP) to each of the transmitters 121, 122, . . . . Furthermore, the distributed transmission adapter (DTxA) 110 transmits VSB mode information and reserved region information of the field synchronization segment to each of the transmitters 121, 122, . . . through a field rate side channel (FRSC).

Thereafter, each of the transmitters 121, 122, . . . uses the identification signal to synchronize the data frame to the TS packet that is being inputted. More specifically, the transmitters may not be able initiate operation simultaneously, or, in case a malfunction or problem occurs in a particular transmitter, only the corresponding transmitter may have to re-initiate operation. In this case, an insertion position of field synchronization signal that have an effect on initialization of trellis encoder, data interleaver, and data randomizer may use each transmitters 121, 122, . . . differently. Furthermore, even though the same TP data are processed and transmitted, since the status of each data interleaver, data randomizer, and trellis encoder is different from one another, the data being outputted from each corresponding transmitter 121, 122, . . . are eventually different from one another as well. Evidently, under such circumstances, the receiving system is unable to receive data successfully.

Therefore, the identification signal is used as a reference signal for inserting a field synchronization signal at the same point of time in each of the transmitters 121, 122, . . . . Accordingly, the data at the point where signal processing is initiated in each of the transmitters 121, 122, . . . may conform with one another.

Additionally, each of the transmitters 121, 122, . . . extracts status information of the trellis encoder (including the pre-coder) in which the DTxP is included and accords the status of each trellis encoders with the pre-determined point of time. For example, each of the transmitters 121, 122, . . . receives the DTxP and extracts the corresponding information. Thereafter, prior to having the TP packet inputted to the trellis encoder, wherein the TP packet is subsequent to a very first field synchronization signal that is to be inserted. The memory status of the trellis encoder is set to be the same as the memory status received through the DTxP. Furthermore, each of the transmitters 121, 122, . . . extracts time offset information associated with the corresponding transmitter, thereby adjusting a sending (or transmission) time of an output symbol. More specifically, a global positioning system (GPS) connected to the distributed transmission adapter (DTxA) 110 and each of the transmitters 121, 122, . . . is used to synchronize the time and frequency of the distributed transmission adapter (DTxA) 110 and each of the transmitters 121, 122, . . . .

At this point, the distributed transmission adapter (DTxA) 110 uses external reference time information to create time offset information that is to be sent to each transmitter 121, 122, . . . . The distributed transmission adapter (DTxA) 110 also uses an external frequency reference information in order to accurately match the output TS data rate. Furthermore, each of the transmitters 121, 122, . . . uses the external time reference information so as to transmit signals associated with the time offset information sent from the distributed transmission adapter (DTxA) 110. Also, each of the transmitters 121, 122, . . . uses the external frequency reference information in order to synchronize each transmitter 121, 122, . . . with respect to the carrier.

FIG. 2A illustrates a block diagram of a distributed transmission adapter according to an embodiment of the present invention. Referring to FIG. 2A, the distributed transmission adapter includes a packet jitter mitigator 201, a pre-processor 202, a multiplexer 203, and a DTxP former 204. Additionally, the distributed transmission adapter further includes a data randomizer 205, a RS encoder/non-systematic RS encoder 206, a data interleaver 207, a parity replacer 208, a non-systematic RS encoder 209, a trellis-encoding module 210, a data deinterleaver 211, a RS parity remover 212, a data derandomizer 213, and a DTxP modifier and sync inserter 214.

In the distributed transmission adapter having the above-described structure, as shown in FIG. 2A, the main service data are inputted to the packet jitter mitigator 201, and the mobile service data are inputted to the pre-processor 202. The packet jitter mitigator 201 rearranges relative positions of the main service data packets that are being inputted. Then, the packet jitter mitigator 201 outputs the repositioned main service data packets to the multiplexer 203. The pre-processor 202 performs additional encoding so that the mobile service data can respond more effectively to noise and channel environment undergoing frequent changes. Then, the pre-processor 202 outputs the processed data to the multiplexer 203 in data group units. The multiplexer 203 then multiplexes the repositioned main service data and the mobile service data of the data group in TS packet units, thereby outputting the processed data.

FIG. 2B illustrates a block diagram of the pre-processor according to an embodiment of the present invention. Referring to FIG. 2B, the pre-processor includes a data randomizer 251, a RS frame encoder 252, a block processor 253, a group formatter 254, a data deinterleaver 255, and a packet formatter 256.

The data randomizer 251 receives mobile service data and randomizes the received data, thereby outputting the processed mobile service data to the RS frame encoder 252. At this point, by having the data randomizer 251 randomize the mobile service data, a later randomizing process on the mobile service data performed by a data randomizer 205, which is positioned in a later block, may be omitted. The randomizer of the conventional system may be identically used as the randomizer for randomizing the mobile service data. Alternatively, any other type of randomizer may also be used for this process.

The RS frame encoder 252 performs at least one of an error correction encoding process and an error detection encoding process on the inputted randomized mobile service data so as to provide robustness on the corresponding mobile service data. Thus, by providing robustness on the mobile service data, a group error that may occur due to a change in the frequency environment can be scattered, thereby enabling the corresponding data to respond to the severely vulnerable and frequently changing frequency environment. The RS frame encoder 252 may also include a row permutation process, which permutes mobile service data having a predetermined size in row units. Herein, RS encoding is applied as the error correction encoding process, and cyclic redundancy check (CRC) encoding is applied as the error detection encoding process. When performing RS encoding, parity data that are to be used for error correction are generated. And, when performing CRC encoding, CRC data that are to be used for error detection are generated.

In this embodiment of the present invention, the RS encoding will be adopting a forward error correction (FEC) method. The FEC corresponds to a technique for compensating errors that occur during the transmission process. The CRC data generated by CRC encoding may be used for indicating whether or not the mobile service data have been damaged by the errors while being transmitted through the channel. In the present invention, a variety of error detection coding methods other than the CRC encoding method may be used, or the error correction coding method may be used to enhance the overall error correction ability of the receiving system.

As described above, the mobile service data encoded by the RS frame encoder 252 are inputted to the block processor 253. The block processor 253 then encodes the inputted mobile service data at a coding rate of G/H (wherein, G is smaller than H (i.e., G<H)) and then outputted to the group formatter 254. More specifically, the block processor 113 divides the mobile service data being inputted in byte units into bit units. Then, the G number of bits is encoded to H number of bits. Thereafter, the encoded bits are converted back to byte units and then outputted. For example, if 1 bit of the input data is coded to 2 bits and outputted, then G is equal to 1 and H is equal to 2 (i.e., G=1 and H=2). Alternatively, if 1 bit of the input data is coded to 4 bits and outputted, then G is equal to 1 and H is equal to 4 (i.e., G=1 and H=4). Hereinafter, the former coding rate will be referred to as a coding rate of ½ (½-rate coding), and the latter coding rate will be referred to as a coding rate of ¼ (¼-rate coding), for simplicity.

Herein, when using the ¼ coding rate, the coding efficiency is greater than when using the ½ coding rate, and may, therefore, provide greater and enhanced error correction ability. For such reason, when it is assumed that the data encoded at a ¼ coding rate in the group formatter 254, which is located near the end portion of the system, are allocated to a region in which the receiving performance may be deteriorated, and that the data encoded at a ½ coding rate are allocated to a region having excellent receiving performance, the difference in performance may be reduced. At this point, the block processor 253 may also receive additional information data, such as signaling information including system information. Herein, the additional information data may also be processed with either ½-rate coding or ¼-rate coding as in the step of processing the enhance data. Thereafter, additional information data, such as signaling information, is also considered the same as the mobile service data and processed accordingly. The signaling information is information required that a receiving system receives and processes data included in a data group. The signaling information may include data group information, multiplexing information, burst information, and so on.

Meanwhile, the group formatter 254 inserts mobile service data that are outputted from the block processor 253 in corresponding regions within a data group, which is configured in accordance with a pre-defined rule. Also, with respect to the data deinterleaving process, each place holder or known data are also inserted in corresponding regions within the data group. At this point, the data group may be divided into at least one hierarchical region. Herein, the type of mobile service data being inserted to each region may vary depending upon the characteristics of each hierarchical region. For example, each region may be divided based upon the receiving performance within the data group.

Herein, the data group is divided into a plurality of different regions so that each region can be used for different purposes. More specifically, a region having less or no interference from the main service data may provide a more enhanced (or powerful) receiving performance as compared to a region having relatively more interference from the main service data. Furthermore, when using a system inserting and transmitting known data into the data group, and when a long known data sequence is to be consecutively inserted into the mobile service data, a known data sequence having a predetermined length may be consecutively inserted into a region having no interference from the main service data. Conversely, in case of the regions having interference from the main service data, it is difficult to consecutively insert long known data sequences and to periodically insert the known data into the corresponding regions due to the interference from the main service data.

In addition, the group formatter 254 also inserts supplemental (or ancillary) data, such as signaling information that notifies the overall transmission information, other than the mobile service data in the data group. Also, apart from the encoded mobile service data outputted from the block processor 253, the group formatter 254 also inserts MPEG header place holders, non-systematic RS parity place holders, main service data place holders, which are related to data deinterleaving in a later process. Herein, the main service data place holders are inserted because the mobile service data bytes and the main service data bytes are alternately mixed with one another based upon the input of the data deinterleaver. For example, based upon the data outputted after the data-deinterleaving process, the place holder for the MPEG header may be allocated at the very beginning of each packet.

Furthermore, the group formatter 254 either inserts known data generated in accordance with a pre-determined method or inserts known data place holders for inserting the known data in a later process. Additionally, place holders for initializing the trellis encoding module 310 are also inserted in the corresponding regions. For example, the initialization data place holders may be inserted in the beginning of the known data sequence. Herein, the size of the mobile service data that can be inserted in a data group may vary in accordance with the sizes of the trellis initialization data or known data, MPEG headers, and RS parity data.

The output of the group formatter 254 is inputted to the data deinterleaver 255. And, the data deinterleaver 255 deinterleaves data by performing an inverse process of the data interleaver on the data and place holders within the data group, which are then outputted to the packet formatter 256. The packet formatter 256 removes the main service data place holders and the RS parity place holders that were allocated for the deinterleaving process from the deinterleaved data being inputted. Then, the packet formatter 256 groups the remaining portion and replaces the 4-byte MPEG header place holder with an MPEG. Also, when the group formatter 254 inserts known data place holders, the packet formatter 256 may insert actual known data in the known data place holders, or may directly output the known data place holders without any modification in order to make replacement insertion in a later process. Thereafter, the packet formatter 256 identifies the data within the packet-formatted data group, as described above, as a 188-byte unit mobile service data packet (i.e., MPEG TS packet), which is then provided to the multiplexer 203.

The multiplexer 203 multiplexes the mobile service data packet of the 188-byte unit outputted from the packet formatter 256 and the main service data packet in accordance with a pre-defined multiplexing method. Then, the multiplexer 203 outputs the multiplexed data packets to the DTxP former 204. Herein, the multiplexing method may vary in accordance with various variables of the system design. One of the multiplexing methods of the multiplexer 203 consists of providing a burst-on section and burst-off section along a time axis, and then, transmitting a plurality of data groups during a burst-on section and transmitting only the main service data during the burst-off section. At this point, main service data may also be transmitted in the burst-on section. More specifically, a plurality of consecutive mobile service data packets is grouped to form a data group. And, a plurality of such data groups is mixed with main service data packets so as to create a burst-on section.

In this case, mobile service data and main service data co-exist in a burst-on section, and only the main service data exist in the burst-off section. Therefore, the main service data section transmitting the main service data exist in both the burst-on section and the burst-off section. At this point, the number of main service data packets included in the main service data section within the burst-on section and the number of main service data packets included in the main service data section within the burst-off section may be equal to or different from one another. When the mobile service data are transmitted in burst units, as described above, a receiving system that only receives the mobile service data may turn on the power only during the burst-on section so as to receive the corresponding data. Also, in this case, the receiving system may turn off the power during burst-off section, thereby preventing the main service data from being received. Thus, the receiving system is capable of reducing excessive power consumption.

However, since a data group including mobile service data in-between the data bytes of the main service data during the packet multiplexing process, the shifting of the chronological position (or place) of the main service data packet becomes relative. Also, a system object decoder (i.e., MPEG decoder) for processing the main service data of the digital broadcast receiving system, receives and decodes only the main service data and recognizes the mobile service data packet as a null data packet. Therefore, when the system object decoder of the receiving system receives a data group including mobile service data and a main service data packet that is multiplexed with the data group, a packet jitter occurs.

At this point, since a multiple-level buffer for the video data exists in the system object decoder and the size of the buffer is relatively large, the packet jitter generated from the multiplexer 203 does not cause any serious problem in case of the video data. However, since the size of the buffer for the audio data is relatively small, the packet jitter may cause considerable problem. More specifically, due to the packet jitter, an overflow or underflow may occur in the buffer for the main service data of the receiving system (e.g., the buffer for the audio data). Therefore, the packet jitter mitigator 201 re-adjusts the relative position of the main service data packet so that the overflow or underflow does not occur in the system object decoder.

In the present invention, examples of repositioning places for the audio data packets within the main service data in order to minimize the influence on the operations of the audio buffer will be described in detail. The packet jitter mitigator 201 repositions audio packets of the main service data section so that the audio data packets of the main service can be positioned as equally and uniformly as possible.

The standard for repositioning the audio data packets in the main service data performed by the packet jitter mitigator 201 will now be described. Herein, it is assumed that the packet jitter mitigator 201 knows the same multiplexing information as that of the multiplexer 203, which is placed further behind the packet jitter mitigator 201.

Firstly, if one audio data packet exists in the main service data section (e.g., the main service data section positioned between two data groups) within the burst-on section, the audio data packet is positioned at the very beginning of the main service data section. Alternatively, if two audio data packets exist in the corresponding data section, one audio data packet is positioned at the very beginning and the other audio data packet is positioned at the very end of the main service data section. Further, if more than three audio data packets exist, one audio data packet is positioned at the very beginning of the main service data section, another is positioned at the very end of the main service data section, and the remaining audio data packets are positioned between the first and last audio data packets at equal intervals.

Secondly, during the main service data section within the burst-off section, which is placed immediately before the beginning of a burst-on section (i.e., during a burst-off section), the audio data packet is placed at the very end of the main service data section.

Thirdly, during a main service data section within the burst-off section subsequent to the burst-on section, the audio data packet is positioned at the very beginning of the main service data section.

And, finally, the data packets other than audio data packets are positioned in accordance with the inputted order in vacant spaces (i.e., spaces that are not designated for the audio data packets). Meanwhile, when the positions of the main service data packets are relatively re-adjusted, associated program clock reference (PCR) values may also be modified accordingly. The PCR value corresponds to a time reference value for synchronizing the time of the system target decoder. Herein, the PCR value is inserted in a specific region of a TS packet and then transmitted. In the example of the present invention, the packet jitter mitigator 201 also performs the operation of modifying the PCR value.

The output of the packet jitter mitigator 201 is inputted to the multiplexer 203. The multiplexer 203 multiplexes the main service data outputted from the packet jitter mitigator 201 and the mobile service data outputted from the pre-processor 202, as described above, in burst units according to a predetermined multiplexing rule. Then, the processed data are outputted to the DTxP former 204. The DTxP former 204 is connected to the GPS. Herein, when the inputted packet corresponds to an operation and maintenance packet (OMP), then the inputted packet is modified so as to be configured as a DTxP packet. The OMP is included in the main service data and inputted to the distributed transmission adapter 110. The OMP corresponds to a TS-type packet which is used for the purpose of system operation and maintenance in a MPEG-2 transport system. In this embodiment, a packet identifier (PID) of the OMP corresponds to 0x1FFA. The PID is allocated with 13 bits and indicated in the header of each MPEG TS packet.

FIG. 6A illustrates a syntax structure of a 184-byte OM packet excluding a 4-byte MPEG TS packet header. The OM packet of FIG. 6A includes an OM_type field and an OM_payload field. In this example, the OM_type field is allocated with 1-byte, which indicates a type of data structure included in the OM_payload field. (In other words, the first byte of the 184-byte payload indicates the type of data structure included in the remainder of the payload.) Herein, the OM_payload field is allocated with 183 bytes and includes actual data.

When the OM packet is used as the DTxP, the OM_type field has a value ranging from 0x00 to 01F. (In other words, the OM_type field shall be set to a value between 0x00 to 01F so as to indicate the distributed transmission packet.) If the OM_type field value ranges from 0x00 to 01F, the OM_payload field of FIG. 6A may include DTxP information including a DTx_packet( ) syntax structure as shown in FIG. 6B.

Referring to FIG. 6B, a DTxP payload field DTx_packet( ) may include a first repetition statement being repeated as much as the number of trellis encoders (e.g., 12 trellis encoders=12 times), a synchronization_time_stamp field, a network_identifier_pattern field, a stream_locked_flag field, a packet_number field, a second repetition statement being repeated as much as the number of transmitters, and a DTxP_ECC field.

Herein, the first repetition statement includes a trellis_code_state field. As an example of the present invention, the trellis_code_state field is allocated with 8 bits and indicates the status information of each trellis encoder. The trellis_code_state field carries two copies of the three bits corresponding to the status of a pre-coder/trellis encoder pair with added parity data. Herein, one copy is bit-inverted from the other. In other words, each trellis encoder includes 3 memory units therein. 3 bits are assigned for the status value of the three memories. Among the 3 bits, if the number of ones (1's) corresponds to an even number, then a parity data bit indicating a value of '0' is allocated and added. On the other hand, if the number of ones (1's) corresponds to an odd number, then a parity data bit indicating a value of '1' is allocated and added. Thereafter, the value for each of the 4 bits is inversed, and, accordingly, 4 inversed bits are further added, thereby configuring set of 8 bits allocated to the status information of the trellis encoder memory.

In this example, 24 bits are assigned to the synchronization_time_stamp field. Based upon reference signals notifying elapsed time information of 1 second, which is acquired from the GPS, the synchronization_time_stamp field indicates the point when an MPEG synchronization byte of the corresponding DTxP is outputted from the dispersed transmission adapter 110. In other words, the synchronization_time_stamp (STS) field indicates the elapsed time between a 1-second tick of the reference clock and the release from the DTxA of the first bit of the MPEG-2 packet synchronization byte in the header of the DTxP.

The maximum_delay field is allocated with 24 bits. And, the maximum_delay field indicates a maximum time delay predetermined in the system, between an output point of the DTxA 110 and an output point of the symbols corresponding to each of the transmitters 121, 122, . . . . In other words, the maximum_delay field indicates the time delay setting in the system between the output time of the DTxA and the time of emission of the corresponding symbol from each of the transmitters. More specifically, the time required for the packets outputted from the DTxA 110 to reach each of the transmitters 121, 122, . . . may be different from the time required for data processing the packets in each of the transmitters 121, 122, . . . . Among the different time delays, the highest value is notified to each transmitter 121, 122, . . . , thereby enabling all transmitters 121, 122, . . . to transmit signals at the same point of time.

In this example, 12 bits are assigned to the network_identifier_pattern field. More specifically, the network_identifier_pattern field corresponds to 12 bits of a 24-bit unique (or single) code symbol sequence allocated to each of the transmitters 121, 122, . . . , thereby forming a specific group with a plurality of transmitters equally having the same 12 bits. At this point, each of the transmitters 121, 122, . . . may be combined with 12 bits of a tx_address field, which will be described in a later process, thereby forming a seed value of the combined 24 bits. In other words, the network_identifier_pattern field representing the network in which the transmitter is located provides a seed value for 12 of the 24 bits used to set the symbol sequence of a unique code assigned to each transmitter.

The stream_locked_flag field is allocated with 1 bit. The stream_locked_flag field also indicates whether the transmitter operating as a slave transmitter locks the symbol clock frequency to an inputted data stream clock frequency, or whether the corresponding transmitter locks the symbol clock frequency to an identical external reference frequency. In other words, the stream_locked_flag field indicates to a slave transmitter whether it is to lock its symbol clock frequency to the incoming data stream clock frequency or to lock its symbol clock frequency to the same external precision reference frequency used throughout the network.

The packet_number field is allocated with 10 bits and indicates the number of MPEG-2 transport stream (TS) packets that have occurred in the stream since the last identification signal to and including the DTxP.

The tx_group_number field is allocated with 8 bits. Herein, the tx_group_number field indicates the first 8 bits of 12-bit addresses corresponding to the specific group of transmitters. In other words, the tx_group_number field that carries the first 8 bits of the 12-bit addresses of the group of transmitters to which information is individually addressed in the packet instance.

The second repetition statement is repeated as much as the number of transmitters. Herein, the second repetition statement includes a tx_address field, a tx_identifier_level field, a tx_data_inhibit field, a tx_time_offset field, and a tx_power field.

Herein, the tx_address field is allocated with 12 bits and indicates an address of a corresponding transmitter. In other words, the tx_address field carries the address of the transmitter to which the following fields are relevant and which shall be used to seed a portion of the RF watermark code sequence generator.

In this example, 3 bits are assigned to the tx_identifier_level field, which designates one of the 8 level for transmitting 8 RF watermark signals of the corresponding transmitter. In other words, the tx_identifier_level field that indicates to which of 8 levels (including off) the RF watermark signal of each transmitter shall be set.

The tx_data_inhibit field is allocated with 1 bit. Herein, the tx_data_inhibit field indicates that the tx_data field information is not encoded by the RF watermark signal. In other words, the tx_data_inhibit field indicates when the tx_data information should not be encoded into the RF watermark signal.

The tx_time_offset field is allocated with 16 bits. The tx_time_offset field indicates a time offset, which corresponds to a difference between a transmission point defined by the maximum_delay field and an actual transmission point from each transmitter. In other words, the tx_time_offset field indicates the time offset between a reference time determined using maximum_delay and the time of emission of the individual transmitter to which it is addressed.

The tx_power field is allocated with 12 bits and indicates the power level of the corresponding transmitter.

The DTxP_ECC field is allocated with 160 bits, i.e., 20 bytes, and indicates Reed-Solomon (RS) error correction codes. Herein, the 20 bytes worth of Reed Solomon error correcting code are used to protect the remaining 164 payload bytes of the packet. More specifically, the DTxP_ECC field performs a (164,184)-RS error correction encoding process on 164 bytes of the 184-byte packet configuring the DTxP, wherein the 164 bytes carry the remaining information, thereby generating an carrying 20 bytes of RS parity data.

Referring to FIG. 6A and FIG. 6B, the definitions of the formats will now be described. More specifically, "bslbf" signifies 'bit serial, leftmost bit first', "riuimsbfwp" indicates 'repeated, inverted, unsigned integer, most significant bit first, with parity'. "riuimsbf" represents 'repeated, inverted, unsigned integer, most significant bit first'. Additionally, "uimsbf" signifies 'unsigned integer, most significant bit first', and "uipfmsbf" means 'unsigned integer plus fraction, most significant bit first'. Furthermore, "tcimsbf" represents 'twos complement integer, most significant bit first'.

As shown in FIG. 6B, the DTxP payload includes status information of each of the 12 trellis encoders, diverse time information, time offset or power level information corresponding to each transmitter, and so on. Additionally, a 20-byte parity is also included in the DTxP payload, the 20-byte parity having the above-mentioned information RS-coded therein. At this point, the DTxP former 204 inserts a trellis_code_state field value and a RS parity value, among the DTxP information of FIG. 6B, as default values. The remaining information uses the reference time and frequency information of the GPS so as to insert diverse data types, which configure the single frequency network. The output of the DTxP former 204 is inputted to the data randomizer 205.

If the inputted data correspond to the main service data packet, the data randomizer 205 performs the same randomizing process as that of the conventional randomizer. More specifically, the synchronization byte within the main service data packet is deleted. Then, the remaining 187 data bytes are randomized by performing a bitwise exclusive OR (XOR) operation on a pseudo random byte generated from the data randomizer 205. Thereafter, the randomized data are outputted to the RS encoder/non-systematic RS encoder 206.

On the other hand, if the inputted data correspond to the mobile service data packet, the data randomizer 205 deletes the synchronization byte from the 4-byte MPEG header included in the mobile service data packet and, then, performs the randomizing process only on the remaining 3 data bytes of the MPEG header. Thereafter, the randomized data bytes are outputted to the RS encoder/non-systematic RS encoder 206. Additionally, the randomizing process is not performed on the remaining portion of the mobile service data excluding the MPEG header. In other words, the remaining portion of the mobile service data packet is directly outputted to the RS encoder/non-systematic RS encoder 206 without being randomized. This is because a randomizing process has already been performed on the mobile service data in the data randomizer 251. Also, the data randomizer 205 may or may not perform a randomizing process on the known data (or known data place holders) and the initialization data place holders included in the mobile service data packet. Further, the data randomizer 205 may continue to generate pseudo random bytes even in the mobile service sections.

The RS encoder/non-systematic RS encoder 206 performs an RS-coding process on the data being randomized by the data randomizer 205 or on the data bypassing the data randomizer 205, so as to add 20 bytes of RS parity data. Thereafter, the processed data is outputted to the data interleaver 207. Herein, if the inputted data correspond to the main service data packet, the RS encoder/non-systematic RS encoder 206 performs the same systematic RS-encoding process as that of the conventional system, thereby adding the 20-byte RS parity data at the end of the 187-byte data. Alternatively, if the inputted data correspond to the mobile service data packet, the RS encoder/non-systematic RS encoder 206 performs a non-systematic RS-encoding process. At this point, the 20-byte RS parity data obtained from the non-systematic RS-coding process is inserted in a pre-decided parity byte place within the mobile service data packet.

The data interleaver 207 corresponds to a byte unit convolutional interleaver. The output of the data interleaver 207 is inputted to the parity replacer 208 and to the non-systematic RS encoder 209. Meanwhile, a process of initializing a memory within the trellis encoding module 210 is primarily required in order to decide the output data of the trellis encoding module 210, which is located after the parity replacer 208, as the known data pre-defined according to an agreement between the receiving system and the transmitting system. More specifically, the memory of the trellis encoding module 210 should first be initialized before the inputted known data sequence is trellis-encoded.

At this point, the beginning portion of the known data sequence that is inputted corresponds to the initialization data place holder and not to the actual known data. Therefore, the process of generating initialization data and replacing the initialization data place holder of the corresponding memory with the generated initialization data are required to be performed immediately before the inputted known data sequence is trellis-encoded.

Additionally, a value of the trellis memory initialization data is decided and generated based upon a memory status of the trellis encoding module 210. Further, due to the newly replaced initialization data, a process of newly calculating the RS parity and replacing the RS parity, which is outputted from the data interleaver 207, with the newly calculated RS parity is required. Therefore, the non-systematic RS encoder 209 inputs the mobile service data packet including the initialization data place holders, which are to be replaced with the actual initialization data, from the data interleaver 207 and also inputs the initialization data from the trellis encoding module 210.

Among the inputted mobile service data packet, the initialization data place holders are replaced with the initialization data, and the RS parity data that are added to the mobile service data packet are removed. Thereafter, a new non-systematic RS parity is calculated and then outputted to the parity replacer 208. Accordingly, the parity replacer 208 selects the output of the data interleaver 207 as the data within the mobile service data packet, and the parity replacer 208 selects the output of the non-systematic RS encoder 209 as the RS parity data. Then, the selected data are outputted to the trellis encoding module 210.

Meanwhile, if the main service data packet is inputted or if the mobile service data packet, which does not include any initialization data place holders, is inputted, the parity replacer 208 selects the data and RS parity that are outputted from the data interleaver 207. Then, the parity replacer 208 directly outputs the selected data to the trellis encoding module 210 without any modification.

As described above, the trellis encoding module 210 performs trellis-encoding and modifies the input data of the trellis encoding module 210 so that a memory of the trellis encoding module 210 can be initialized to a desired state at the starting point of a known data sequence. Thereafter, the trellis encoding module 210 outputs the modified input data (i.e., the trellis memory initialization data) to the non-systematic RS encoder 209 and to the data deinterleaver 211. More specifically, the trellis encoding module 210 does not output any trellis-encoded output symbols. Instead, the trellis encoding module 210 outputs the modified input data of the trellis encoding module 210. Additionally, the trellis encoding module 210 outputs memory status information of the trellis encoder to the DTxP modifier and sync inserter 214.

The data deinterleaver 211 receives the remaining data excluding the modified data from the parity replacer 208. Then, the data deinterleaver 211 performs an inverse process of the data interleaver 207 on the received data and outputs the processed data to the RS parity remover 212. Without determining whether the received data correspond to main service data or mobile service data, the RS parity remover 212 removes the last 20 bytes from the 207-byte RS-encoded data packet. Thereafter, the RS parity remover 212 outputs the parity-removed data to the data derandomizer 213. The data derandomizer 213 derandomizes the received 187 data bytes without determining whether the received RS-encoded data packet having the last 20 bytes removed by the RS parity remover 212 correspond to the main service data or the mobile service data. Thereafter, the data derandomizer 213 outputs the derandomized data to the DTxP modifier and sync inserter 214.

The DTxP modifier and sync inserter 214 adds a MPEG synchronization byte to the output data of the data derandomizer 213, which is being inputted in 187-byte packet units, thereby forming a 188-byte unit TS packet. At this point, the transmitter generates an identification signal at a predetermined cycle period of one data packet, so that the data packets and the TS packets can be synchronized. For example, the identification signal may be generated after each set of 312 data packets or after each set of 624 data packets. At this point, when a identification signal is generated for each set of 312 data packets, the identification signal may respectively designate insertion positions of an odd field synchronization signal and an even field synchronization signal. In this case, the identification signal values for each field may be identical to one another or different from one another.

Conversely, when a identification signal is generated for each set of 624 data packets, the identification signal may designate an insertion positions for any one of the odd field synchronization signal and the even field synchronization signal. For example, when it is assumed that the identification signal is generated for each set of 624 data packets and that the identification signal designates the insertion position of the odd field synchronization signal, the even field synchronization signal is inserted after 312 data segments from the odd field synchronization signal. Herein, the counting of the data segments begins from the data segment subsequent to the odd field synchronization signal. The data packet may correspond to any one of the main service data packet and the mobile service data.

The identification signal values may indicate values predecided based upon an agreement between the transmitting system and the receiving system. For example, the synchronization byte values may be modified so as to be used as the identification signals. More specifically, the synchronization byte values may be inversed for each bit so as to be used as the identification signal. Alternatively, the synchronization byte values may be partially inversed so as to be used as the identification signals. When it is assumed that the synchronization byte values are inversed for each bit so as to be used as the identification signals, this indicates that a synchronization byte (0x47) of the MPEG-2 TS packet is inversed for each bit at a predetermined data packet cycle (e.g., a cycle of 312 data packets or 624 data packets). In other words, if the synchronization byte is 0x47, the identification signal may be 0xB8.

At this point, the inversion of the MPEG synchronization byte should be synchronized with the operation of the multiplexer 203 shown in FIG. 2A. This is because the mobile service data packet is multiplexed with the main service data packet at a fixed position based upon a field synchronization signal. Therefore, the generation of the identification signal is also related to the operation of the multiplexer 203 shown in FIG. 2A. The DTxP modifier and sync inserter 214 searches for a DTxP among the data packets having an MPEG synchronization byte inserted therein. The DTxP may be searched by using a variety of methods. A method of searching the DTxP by using a PID value will be given as an exemplary method according to an embodiment of the present invention.

If the inputted data packet is a DTxP, the DTxP modifier and sync inserter 214 inserts status information (i.e., a memory status) of a trellis encoder at a predetermined point, the status information being inputted from the trellis encoding module 210, to a trellis_code_state field shown in FIG. 6B. The DTxP modifier and sync inserter 214 then (N,K) (N=184,K=164)-RS-encodes the inserted memory status, thereby inserting 20 bytes of parity data to a DTxP_ECC field of shown in FIG. 6B. Meanwhile in the VSB mode broadcasting system, 24 bits of VSB mode data and 92 bits of reserved data are transmitted to the field synchronization segment. At this point, the DTxP modifier and sync inserter 214 transmits data shown in FIG. 6C through the FRSC, so as to enable each transmitter to transmit the same VSB mode data and reserved data.

FIG. 6C illustrates an exemplary syntax structure of a Field Rate Side Channel( ). Herein, the FRSC data may include a VSB_mode_data field, a dfs_reserved_data field, and a side_channel_ECC field. More specifically, the VSB_mode_data field is allocated with 24 bits and transmits VSB mode data. The dfs_reserved_data field is allocated with 92 bits and transmits reserved data. And, the side_channel_ECC field is allocated with 160 bits and transmits 20 bytes of RS parity data. Herein, a reserved field allocated with 36 bits may be further included between the dfs_reserved_data field and the side_channel_ECC field. At this point, the VSB_mode_data field, the dfs_reserved_data field, and the reserved field collectively consist of 19 bytes.

The DTxP modifier and sync inserter 214 performs (N,K) (N=39,K=19)-RS-encoding on the 19 bytes so as to generate 20 bytes of parity data, which are then inserted to the side_channel_ECC field. More specifically, the DTxP modifier and sync inserter 214 RS-encodes the 19-byte information so as to create (or generate) a total of 39 bytes (i.e., 312 bits). The DTxP modifier and sync inserter 214 transmits the FRSC data, as described in FIG. 6C, to each of the transmitters 121, 122, . . . .

Herein, the FRSC data may be transmitted by using a variety of methods. In the example of the present invention, the FRSC data are inserted in the transport_error_indicator flag field of the inputted TS packet header, thereby transmitted to each of the transmitters 121, 122, . . . . More specifically, the 312-bit FRSC data are transmitted through the 1-bit transport_error_indicator flag field, which is included in the TS packet header. At this point, since one data field transmits 312 TS packets, one set of 312-bit FRSC data is transmitted to each of the transmitters 121, 122, . . . for each data field.

The output of the DTxP modifier and sync inserter 214 is inputted to each transmitter (or DTV transmitter) as the final output of the distributed transmission adapter (DTxA). According to another embodiment of the present invention, the FRSC data may be inserted by the DTxP former 204 instead of the DTxP modifier and sync inserter 214.

Figure 3:
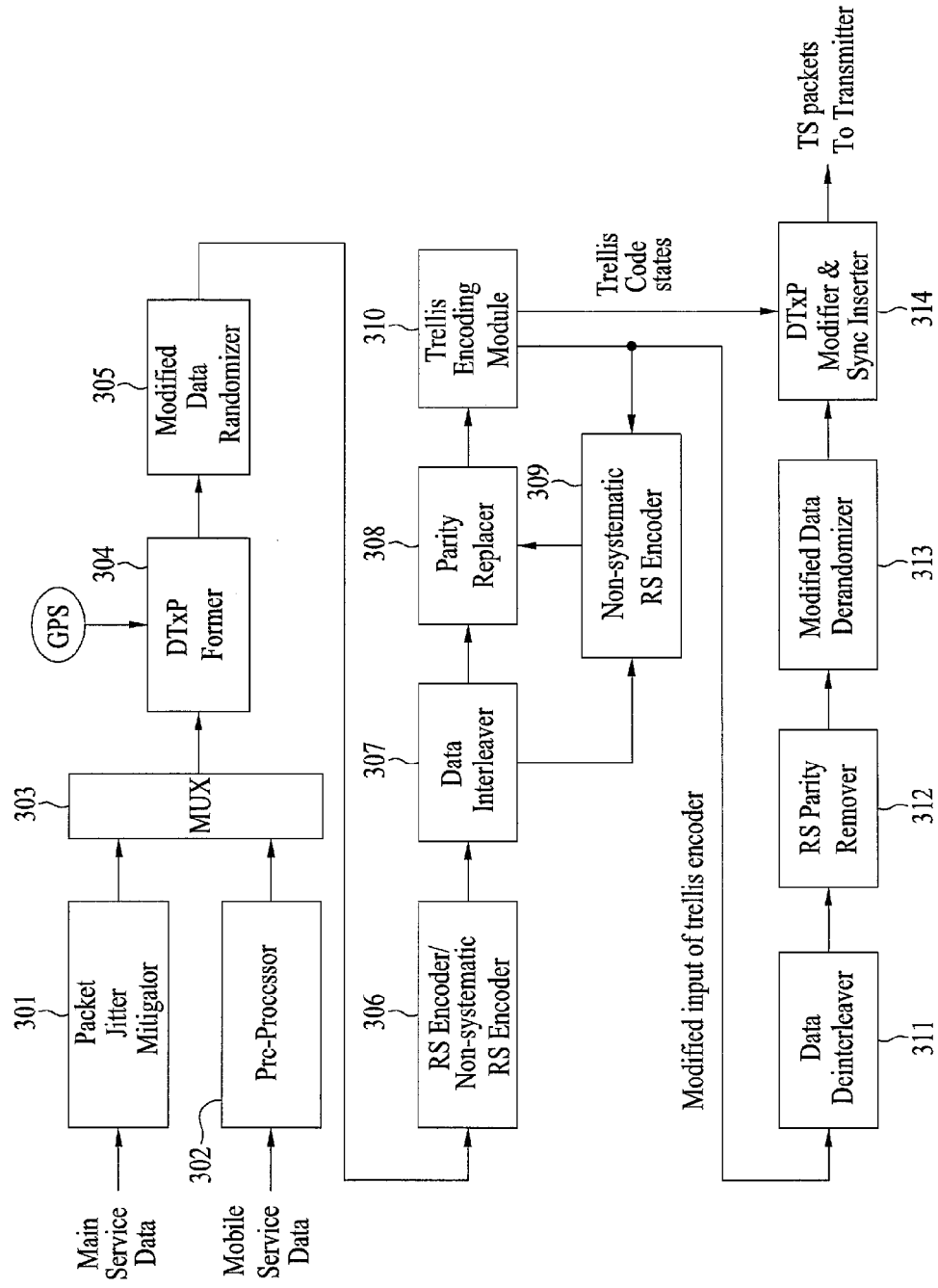
FIG. 3 illustrates a block diagram of a distributed transmission adapter shown in FIG. 1 according to another embodiment of the present invention.

FIG. 3 illustrates a distributed transmission adapter (DTxA) of FIG. 2A according to another embodiment of the present invention. The difference between the distributed transmission adapter (DTxA) of FIG. 2A and that shown in FIG. 3 is the RS parity remover 312 and the data derandomizer 313. More specifically, when the inputted data corresponds to the main service data, the RS parity remover 312 shown in FIG. 3 removes the last 20 bytes of the inputted 207 data bytes. Alternatively, when the inputted data corresponds to the mobile service data, the RS parity remover 312 removes 20 bytes of non-systematic RS parity data existing in pre-decided positions within the received 207 data bytes.

Furthermore, referring to FIG. 3, the data derandomizer 313 derandomizes the main service data, and internally generates pseudo random byte within respect to the mobile service data, thereby enabling the input data to directly bypass the DTxP modifier and sync inserter 314 without modification. Since the configuration and operation of the blocks shown in FIG. 3 are identical to those shown in FIG. 2A, with the exception of the RS parity remover 312 and the data derandomizer 313, a detailed description of the same will be omitted for simplicity.

Figure 4:
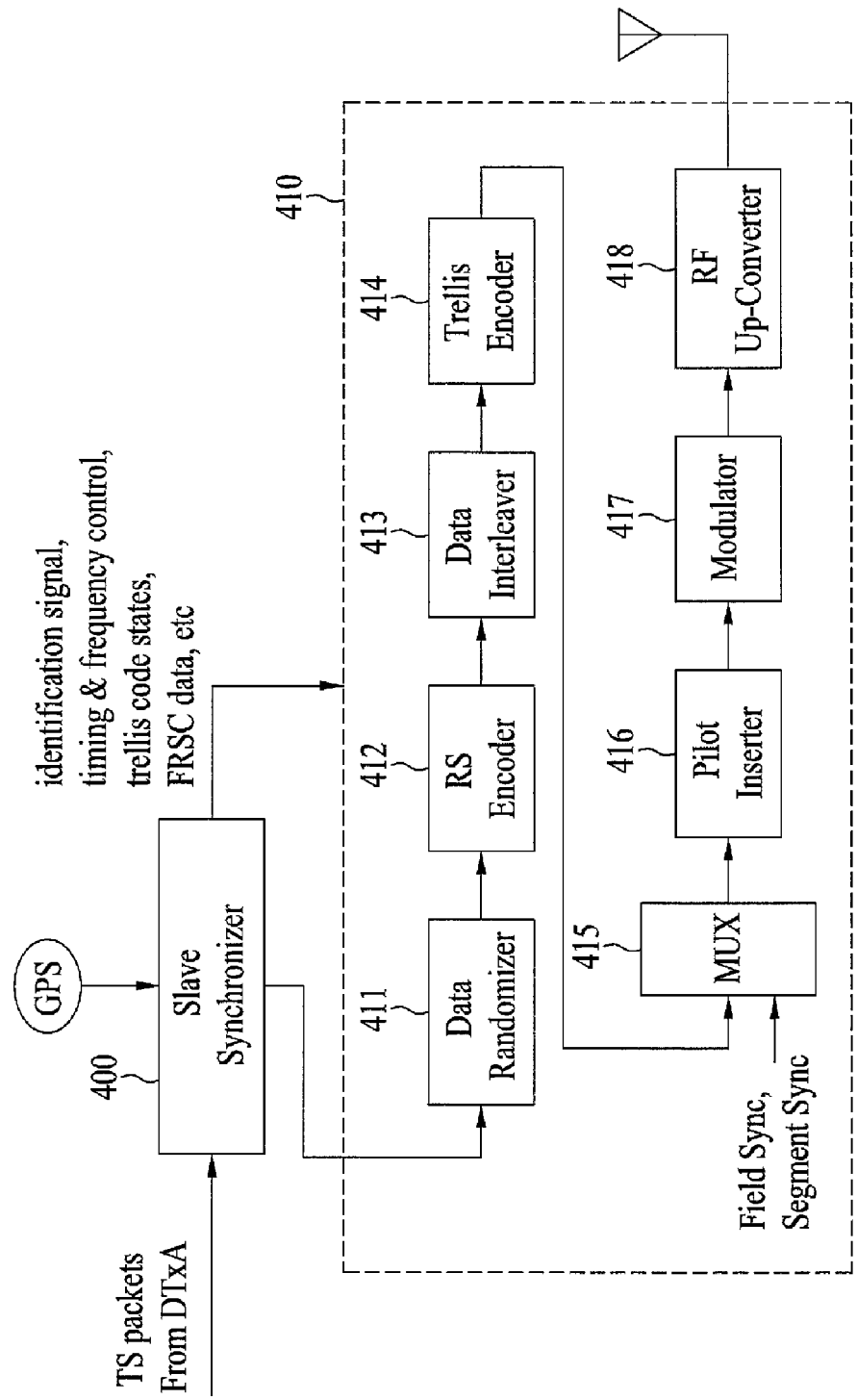
FIG. 4 illustrates a block diagram of a transmitter shown in FIG. 1 according to an embodiment of the present invention.

FIG. 4 illustrates a block diagram of a transmitter (or DTV transmitter) operating as a slave of the distributed transmission adapter (DTxA) of FIG. 2A according to an embodiment of the present invention. The transmitter of FIG. 4 may include a slave synchronizer 400 and a signal processing and RS up-converting unit 410. Herein, the signal processing and RS up-converting unit 410 may either have the same structure as that included in the conventional transmitter, or have the same structure of another disclosed transmitter. In the embodiment of the present invention, the signal processing and RS up-converting unit 410 using the conventional transmitter will be described. In this case, the signal processing and RS up-converting unit 410 includes a data randomizer 411, a RS encoder 412, a data interleaver 413, a trellis encoder 414, a multiplexer 415, a pilot inserter 416, a modulator 417, and a RS up-converter 418.

The slave synchronizer 400 of FIG. 4 performs an operation enabling the signal processing and RS up-converting unit 410 to operate a slave of the distributed transmission adapter 110 in order to embody a single frequency network. The slave synchronizer 400 receives the TS packet transmitted from the distributed transmission adapter 110, so as to detect the identification signal. For example, if the identification signal is inputted once for each set of 624 data packets, and that the MPEG synchronization byte values are inversed for each bit so as to be used as the identification signals, the slave synchronizer 400 detects the MPEG synchronization bytes inverted for each set of 624 data packets, thereby recovering the identification signal. Thus, the signal processing and RS up-converting unit 410 may synchronize the inputted TS packets and the data frame. In other words, by having the data frame insert the field synchronization based upon the identification signal, the data packets and data frame may be synchronized.

Meanwhile, the slave synchronizer 400 filters the PID so as to detect the DTxP. Then, the slave synchronizer 400 performs (N,K)(N=184,K=164)-RS decoding on the detected DTxP, thereby correcting the errors that may occur in the channels between the distributed transmission adapter 110 and the transmitters 121, 122, . . . . Subsequently, the trellis code status information is extracted from the RS-decoded DTxP, which is then provided to the signal processing and RS up-converting unit 410. Thereafter, the signal processing and RS up-converting unit 410 uses the RS-decoded DTxP to set the memory status of the trellis encoder 414 to a corresponding status at a pre-decided point.

In other words, each of the transmitters 121, 122, . . . receives a DTxP so as to detect trellis code status information. Then, each of the transmitters 121, 122, . . . initializes the memory of the trellis encoder included in the corresponding transmitter to the detected trellis encoder status value of the distributed transmission adapter at a pre-decided point. Thus, the status of the trellis encoder included in each transmitter may be synchronized at a fixed point, thereby enabling the final symbol output of each transmitter to be identical to one another.

Additionally, the slave synchronizer 400 uses the timing control information extracted from the DTxP and the reference time and frequency of the GPS so as to accurately control the transmission time and frequency of the final signal outputted from the signal processing and RS up-converting unit 410. At this point, with the exception of the DTxP, the slave synchronizer 400 internally performs adequate buffering on the remaining portion of the inputted TS packet. Thereafter, the processed (or buffered) data are directly passed on the data randomizer 411 of the signal processing and RS up-converting unit 410 without modification.

Conversely, with respect to the DTxP, the trellis code status and 20-byte RS parity are recovered to default values, which are then provided to the signal processing and RS up-converting unit 410. This is because the trellis code status and 20-byte RS parity, which are transmitted from the distributed transmission adapter, correspond to information inserted to the signal processing and RS up-converting unit 410 and not to the DTxP former 204 of the distributed transmission adapter. Therefore, the slave synchronizer 400 inserts the trellis code status and RS parity, which are used as default values in the DTxP former 204 of the distributed transmission adapter, to the trellis_code_state field and the DTxP_ECC field. Thereafter, the slave synchronizer 400 transmits the processed data to the signal processing and RS up-converting unit 410.

Furthermore, the slave synchronizer 400 recovers the VSB mode and reserved bit values included in the field synchronization segment from the FRSC data of the TS packet header. Then, the slave synchronizer 400 provides the recovered VSB mode and reserved bit values to the signal processing and RS up-converting unit 410, thereby allowing the recovered information to be transmitted to the field synchronization segment.

At this point, if the FRSC data were inserted in the DTxP modifier and sync inserter 214 of the distributed transmission adapter, the slave synchronizer 400 extracts the FRSC data from the transport_error_indicator flag field within 312 TS packets. Subsequently, the FRSC data are set to a default value (e.g., '0') within the transport_error_indicator flag field, which are then outputted to the signal processing and RS up-converting unit 410. Herein, the default value corresponds to a value pre-decided by the DTxP former 204 of the distributed transmission adapter for setting the transport_error_indicator flag field.

The signal processing and RS up-converting unit 410 of FIG. 4 receives the output of the slave synchronizer 400, so as to perform the same signal processing steps as the conventional transmitting system. Thereafter, the signal processing and RS up-converting unit 410 up-converts the processed signal to a RF band signal, thereby transmitting the corresponding frequency. More specifically, the data randomizer 411 randomizes the data inputted from the slave synchronizer 400, without determining whether the received data corresponds to the main service data or the mobile service data. Then, the slave synchronizer 400 outputs the randomized data to the data interleaver 413.

The data interleaver 413 interleaves the inputted data and outputs the interleaved data to the trellis encoder 414. The trellis encoder 414 extracts the trellis code status outputted from the slave synchronizer 400 so as to set up the memory of the trellis encoder to a desired status corresponding to a pre-decided point. The data trellis-encoded by the trellis encoder 414 are inputted to the multiplexer 415. The multiplexer 415 refers to the identification signal provided by the slave synchronizer 400 and inserts field synchronization and segment synchronization signals to the data outputted from the trellis encoder 414. Then, the processed data are outputted to the pilot inserter 416. Subsequently, the pilot inserter 416 outputs the pilot-inserted data to the modulator 417 so as to be modulated. Thereafter, the modulated data are transmitted to each receiving system through the RF up-converter 418.

FIG. 5 illustrates a block diagram of a transmitter corresponding to the distributed transmission adapter of FIG. 3 according to an embodiment of the present invention. The role and operation of the slave synchronizer 500 shown in FIG. 5 are identical to those of the slave synchronizer 400 shown in FIG. 4. However, the operations of the data randomizer 511 and the RS encoder/non-systematic RS encoder 512 included in the signal processing and RS up-converting unit 510 of FIG. 5 are different from those of the signal processing and RS up-converting unit 410 shown in FIG. 4.

More specifically, if the inputted data corresponds to the main service data, the data randomizer 511 deletes the synchronization byte within the inputted main service data. Then, the remaining 187 data byte is randomized by performing a bitwise exclusive OR (XOR) operation on a pseudo random byte generated from the data randomizer 511. Thereafter, the randomized data are outputted to the RS encoder/non-systematic RS encoder 512. The RS encoder/non-systematic RS encoder 512 performs an RS-encoding process on the data being randomized by the data randomizer 511 or on the data bypassing the data randomizer 511, so as to add 20 bytes of RS parity data. Thereafter, the processed data are outputted to the data interleaver 513.

Herein, if the inputted data corresponds to the main service data packet, the RS encoder/non-systematic RS encoder 512 performs the same systematic RS-encoding process as that of the conventional system, thereby adding the 20-byte RS parity data at the end of the 187-byte data. Alternatively, if the inputted data corresponds to the mobile service data packet, the RS encoder/non-systematic RS encoder 512 performs a non-systematic RS-coding process. At this point, the 20-byte RS parity data obtained from the non-systematic RS-coding process is inserted in a pre-decided parity byte place within the mobile service data packet. Furthermore, since the blocks subsequent to the signal processing and RS up-converting unit 510 of the data interleaver 513 of FIG. 5 are identical to those shown in FIG. 4, a detailed description of the same will be omitted for simplicity.

Figure 7:
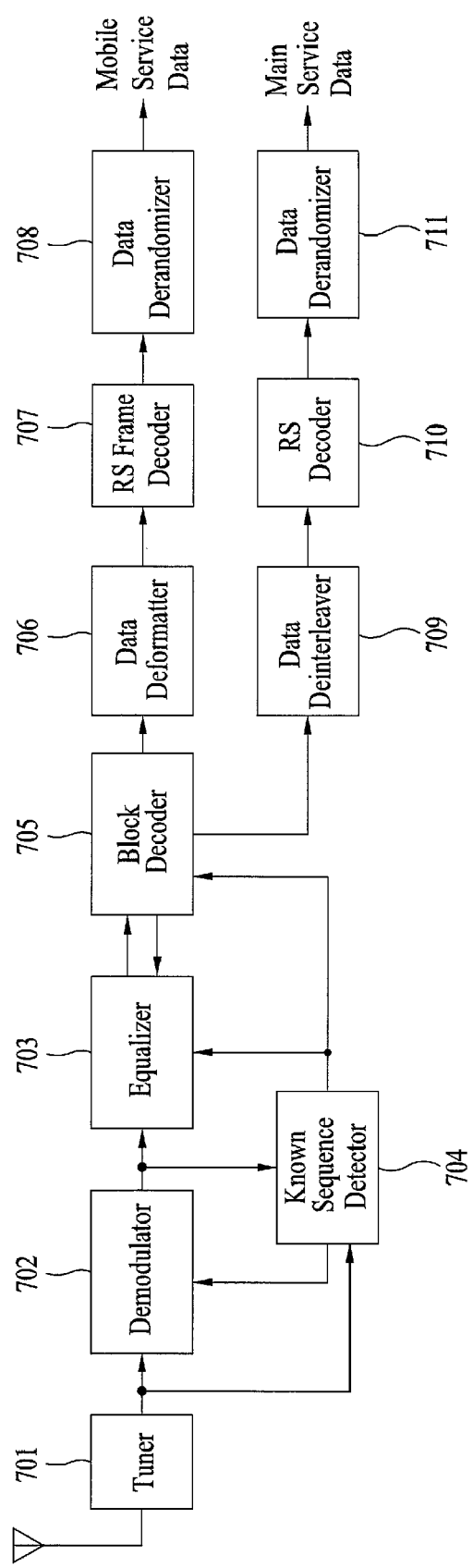
FIG. 7 illustrates a block diagram showing a structure of a receiving system according to an embodiment of the present invention.

FIG. 7 illustrates a block diagram showing a structure of a receiving system according to the present invention. The receiving system of FIG. 7 uses known data information, which is inserted in the mobile service data section and, then, transmitted by the transmitting system, so as to perform carrier recovery, timing recovery, frame synchronization recovery, and channel equalization, thereby enhancing the receiving performance.

Referring to FIG. 7, the receiving system includes a tuner 701, a demodulator 702, an equalizer 703, a known sequence detector 704, a block decoder 705, a data deformatter 706, a RS frame decoder 707, a data derandomizer 708, a data deinterleaver 709, a RS decoder 710, and a data derandomizer 711. Herein, for simplicity of the description of the present invention, the data deformatter 706, the RS frame decoder 707, and the data derandomizer 708 will be collectively referred to as a mobile service data processing unit. And, the data deinterleaver 709, the RS decoder 710, and the data derandomizer 711 will be collectively referred to as a main service data processing unit.

More specifically, the tuner 701 tunes a frequency of a particular channel and down-converts the tuned frequency to an intermediate frequency (IF) signal. Then, the tuner 701 outputs the down-converted IF signal to the demodulator 702 and the known sequence detector 704. The demodulator 702 performs self gain control, carrier recovery, and timing recovery processes on the inputted passband IF signal, thereby modifying the IF signal to a baseband signal. Then, the demodulator 702 outputs the newly created baseband signal to the equalizer 703 and the known sequence detector 704. The equalizer 703 compensates the distortion of the channel included in the demodulated signal and then outputs the error-compensated signal to the block decoder 705.

At this point, the known sequence detector 704 detects the known sequence place inserted by the transmitting end from the input/output data of the demodulator 702 (i.e., the data prior to the demodulation process or the data after the demodulation process). Thereafter, the place information along with the symbol sequence of the known data, which are generated from the detected place, is outputted to the demodulator 702 and the equalizer 703. Also, the known sequence detector 704 outputs a set of information to the block decoder 705. This set of information is used to allow the block decoder 705 of the receiving system to identify the mobile service data that are processed with additional encoding from the transmitting system and the main service data that are not processed with additional encoding. In addition, although the connection status is not shown in FIG. 7, the information detected from the known sequence detector 704 may be used throughout the entire receiving system and may also be used in the data deformatter 706 and the RS frame decoder 707. The demodulator 702 uses the known data symbol sequence during the timing and/or carrier recovery, thereby enhancing the demodulating performance. Similarly, the equalizer 703 uses the known data so as to enhance the equalizing performance. Moreover, the decoding result of the block decoder 705 may be fed-back to the equalizer 703, thereby enhancing the equalizing performance.

Meanwhile, if the data being inputted to the block decoder 705, after being channel-equalized by the equalizer 703, correspond to the mobile service data having additional encoding and trellis encoding performed thereon by the transmitting system, trellis decoding and additional decoding processes are performed on the inputted data as inverse processes of the transmitting system. Alternatively, if the data being inputted to the block decoder 705 correspond to the main service data having only trellis encoding performed thereon, and not the additional encoding, only the trellis decoding process is performed on the inputted data as the inverse process of the transmitting system. The data group decoded by the block decoder 705 is outputted to the data deformatter 706, and the main service data are outputted to the data deinterleaver 709.

More specifically, if the inputted data correspond to the main service data, the block decoder 705 performs Viterbi decoding on the inputted data so as to output a hard decision value or to perform a hard-decision on a soft decision value, thereby outputting the result. Meanwhile, if the inputted data correspond to the mobile service data, the block decoder 705 outputs a hard decision value or a soft decision value with respect to the inputted mobile service data. In other words, if the inputted data correspond to the mobile service data, the block decoder 705 performs a decoding process on the data encoded by the block processor and trellis encoding module of the transmitting system.

At this point, the RS frame encoder of the pre-processor included in the transmitting system may be viewed as an external code. And, the block processor and the trellis encoder may be viewed as an internal code. In order to maximize the performance of the external code when decoding such concatenated codes, the decoder of the internal code should output a soft decision value. Therefore, the block decoder 705 may output a hard decision value on the mobile service data. However, when required, it may be more preferable for the block decoder 705 to output a soft decision value.

Meanwhile, the data deinterleaver 709, the RS decoder 710, and the data derandomizer 711 are blocks required for receiving the main service data. Therefore, the above-mentioned blocks may be omitted from the structure of a receiving system that only receives the mobile service data. The data deinterleaver 709 performs an inverse process of the data interleaver included in the transmitting system. In other words, the data deinterleaver 709 deinterleaves the main service data outputted from the block decoder 705 and outputs the deinterleaved main service data to the RS decoder 710.

The RS decoder 710 performs a systematic RS decoding process on the deinterleaved data and outputs the processed data to the data derandomizer 711. The data derandomizer 711 receives the output of the RS decoder 710 and generates a pseudo random data byte identical to that of the randomizer included in the transmitting system. Thereafter, the data derandomizer 711 performs a bitwise exclusive OR (XOR) operation on the generated pseudo random data byte, thereby inserting the MPEG synchronization bytes to the beginning of each packet so as to output the data in 188-byte main service data packet units.

Meanwhile, the data being outputted from the block decoder 705 to the data deformatter 706 are inputted in the form of a data group. At this point, the data deformatter 706 already knows the structure of the data that are to be inputted and is, therefore, capable of identifying the signaling information, which includes the system information, and the mobile service data from the data group. Thereafter, the data deformatter 706 outputs the identified signaling information to a block for processing signaling information (not shown) and outputs the identified mobile service data to the RS frame decoder 707. At this point, the data deformatter 706 removes the known data, trellis initialization data, and MPEG header, which were inserted in the main service data and data group, and also removes the RS parity, which was added by the RS encoder/non-systematic RS encoder or non-systematic RS encoder of the transmitting system, from the corresponding data. Thereafter, the processed data are outputted to the RS frame decoder 707. More specifically, the RS frame decoder 707 receives only the RS encoded and/or CRC encoded mobile service data that are transmitted from the data deformatter 706.

The RS frame decoder 707 performs an inverse process of the RS frame encoder included in the transmitting system so as to correct the error within the RS frame. Then, the RS frame decoder 707 adds the 1-byte MPEG synchronization service data packet, which had been removed during the RS frame encoding process, to the error-corrected mobile service data packet. Thereafter, the processed data packet is outputted to the data derandomizer 708. The data derandomizer 708 performs a derandomizing process, which corresponds to the inverse process of the randomizer included in the transmitting system, on the received mobile service data. Thereafter, the derandomized data are outputted, thereby obtaining the mobile service data transmitted from the transmitting system.

As described above, the present invention has the following advantages. More specifically, the present invention is robust against (or resistant to) any error that may occur when transmitting mobile service data through a channel. And, the present invention is also highly compatible to the conventional system. Moreover, the present invention may also receive the mobile service data without any error even in channels having severe ghost effect and noise.

Additionally, information, such as identification signals for designating insertion points (or positions) of field synchronization signals in a distributed transmission adapter, information for matching trellis encoder states of each transmitter to coincide at a pre-decided point, timing offset information, and so on, are generated and transmitted to each transmitter operating as slaves of the distributed transmission adapter. Thus, the conventional transmitter structure may be used without modification. And, at the same time, mobile service data may be transmitted to a single frequency network. Furthermore, the present invention is even more effective when applied to mobile and portable receivers, which are also liable to a frequent change in channel and which require protection (or resistance) against intense noise.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of processing digital broadcast data in a digital broadcast receiver, the method comprising:
   receiving a digital broadcast signal comprising main service data, mobile service data, and known data sequences, wherein the digital broadcast signal is processed in a digital broadcast transmitter by:
   randomizing mobile service data in a first randomizer,
   performing Reed-Solomon (RS) encoding and cyclic redundancy check (CRC) encoding on the randomized mobile service data,
   encoding the RS-CRC encoded mobile service data at a coding rate of 1/N, wherein N is an integer greater than 1,
   mapping the mobile service data encoded at the coding rate of 1/N into a data group and adding known data sequences, place holders for main service data, place holders for non-systematic RS parity data, and place holders for moving picture experts group (MPEG) header data to the data group,
   deinterleaving the data group,
   removing the place holders for the main service data and the place holders for the non-systematic RS parity data in the deinterleaved data group and replacing the place holders for the MPEG header data in the deinterleaved data group with the MPEG header data having a packet identifier (PID), thereby outputting mobile service data packets,
   multiplexing the mobile service data packets with main service data packets including the main service data,
   randomizing, by a second randomizer, the multiplexed main service data packets and the MPEG header data of the multiplexed mobile service data packets,
   performing systematic RS encoding on the main service data packets from the second randomizer, and performing non-systematic RS encoding on the mobile service data packets from the second randomizer,
   performing convolutional byte interleaving on the systematic RS-encoded main service data packets and the non-systematic RS-encoded mobile service data packets, and
   trellis encoding data in the interleaved data packets in a trellis encoding unit, wherein at least one memory included in the trellis encoding unit is initialized at each start of the known data sequences;
   demodulating the received digital broadcast signal;
   detecting the known data sequences from the digital broadcast signal;
   compensating channel distortion of the demodulated digital broadcast signal based on at least one of the detected known data sequences; and
   decoding the channel distortion compensated digital broadcast signal.

2. A digital broadcast receiver for processing digital broadcast data, the digital broadcast receiver comprising:
   a tuner for receiving a digital broadcast signal comprising main service data, mobile service data, and known data sequences, wherein the digital broadcast signal is processed in a digital broadcast transmitter by:
   randomizing mobile service data in a first randomizer,
   performing Reed-Solomon (RS) encoding and cyclic redundancy check (CRC) encoding on the randomized mobile service data,
   encoding the RS-CRC encoded mobile service data at a coding rate of 1/N, wherein N is an integer greater than 1,
   mapping the mobile service data encoded at the coding rate of 1/N into a data group and adding known data sequences, place holders for main service data, place holders for non-systematic RS parity data, and place holders for moving picture experts group (MPEG) header data to the data group,
   deinterleaving the data group,
   removing the place holders for the main service data and the place holders for the non-systematic RS parity data in the deinterleaved data group and replacing the place holders for the MPEG header data in the deinterleaved data group with the MPEG header data having a packet identifier (PID), thereby outputting mobile service data packets,
   multiplexing the mobile service data packets with main service data packets including the main service data,
   randomizing, by a second randomizer, the multiplexed main service data packets and the MPEG header data of the multiplexed mobile service data packets,
   performing systematic RS encoding on the main service data packets from the second randomizer, and performing non-systematic RS encoding on the mobile service data packets from the second randomizer,
   performing convolutional byte interleaving on the systematic RS-encoded main service data packets and the non-systematic RS-encoded mobile service data packets, and
   trellis encoding data in the interleaved data packets in a trellis encoding unit, wherein at least one memory included in the trellis encoding unit is initialized at each start of the known data sequences;
   a demodulator for demodulating the received digital broadcast signal;
   a known sequence detector for detecting the known data sequences from the digital broadcast signal;
   an equalizer for compensating channel distortion of the demodulated digital broadcast signal based on at least one of the detected known data sequences; and
   a decoder for decoding the channel distortion compensated digital broadcast signal.

3. A digital broadcast transmitter comprising:
   a first randomizer for randomizing mobile service data;
   a first encoder for performing Reed-Solomon (RS) encoding and cyclic redundancy check (CRC) encoding on the randomized mobile service data;
   a second encoder for encoding the RS-CRC encoded mobile service data at a coding rate of 1/N, wherein N is an integer greater than 1;
   a group formatting unit for mapping the mobile service data encoded at the coding rate of 1/N into a data group and adding known data sequences, place holders for main service data, place holders for non-systematic RS parity data, and place holders for moving picture experts group (MPEG) header data to the data group;
   a deinterleaver for deinterleaving the data group;
   a packet formatter for removing the place holders for the main service data and the place holders for the non-systematic RS parity data in the deinterleaved data group and replacing the place holders for the MPEG header data in the deinterleaved data group with the MPEG header data having a packet identifier (PID), thereby outputting mobile service data packets;

a first multiplexer for multiplexing the mobile service data packets with main service data packets including the main service data;

a second randomizer for randomizing the multiplexed main service data packets and the MPEG header data of the multiplexed mobile service data packets;

a third encoder for performing systematic RS encoding on the main service data packets from the second randomizer, and performing non-systematic RS encoding on the mobile service data packets from the second randomizer; and an interleaver for performing convolutional byte interleaving on the systematic RS-encoded main service data packets and the non-systematic RS-encoded mobile service data packets.

4. The digital broadcast transmitter of claim 3, further comprising:

a trellis encoding unit for trellis encoding data in the interleaved data packets, wherein at least one memory included in the trellis encoding unit is initialized at each start of the known data sequences.

5. The digital broadcast transmitter of claim 4, further comprising:

a second multiplexer for multiplexing the trellis-encoded data with segment synchronization data and field synchronization data.

6. A method of digital broadcast data in a digital broadcast transmitter, the method comprising:

randomizing mobile service data in a first randomizer;

performing Reed-Solomon (RS) encoding and cyclic redundancy check (CRC) encoding on the randomized mobile service data;

encoding the RS-CRC encoded mobile service data at a coding rate of 1/N, wherein N is an integer greater than 1;

mapping the mobile service data encoded at the coding rate of 1/N into a data group and adding known data sequences, place holders for main service data, place holders for non-systematic RS parity data, and place holders for moving picture experts group (MPEG) header data to the data group;

deinterleaving the data group;

removing the place holders for the main service data and the place holders for the non-systematic RS parity data in the deinterleaved data group and replacing the place holders for the MPEG header data in the deinterleaved data group with the MPEG header data having a packet identifier (PID), thereby outputting mobile service data packets;

multiplexing the mobile service data packets with main service data packets including the main service data;

randomizing, by a second randomizer, the multiplexed main service data packets and the MPEG header data of the multiplexed mobile service data packets;

performing systematic RS encoding on the main service data packets from the second randomizer, and performing non-systematic RS encoding on the mobile service data packets from the second randomizer; and performing convolutional byte interleaving on the systematic RS-encoded main service data packets and the non-systematic RS-encoded mobile service data packets.

7. The method of claim 6, further comprising:

trellis encoding data in the interleaved data packets in a trellis encoding unit, wherein at least one memory included in the trellis encoding unit is initialized at each start of the known data sequences.

8. The method of claim 7, further comprising: multiplexing the trellis-encoded data with segment synchronization data and field synchronization data.

* * * * *